United States Patent
Lin

(10) Patent No.: US 9,898,644 B2
(45) Date of Patent: Feb. 20, 2018

(54) TOUCH PANEL WITH FINGERPRINT IDENTIFICATION FUNCTION

(71) Applicant: Chih-Chung Lin, Taipei (TW)

(72) Inventor: Chih-Chung Lin, Taipei (TW)

( * ) Notice: Subject to any disclaimer, the term of this patent is extended or adjusted under 35 U.S.C. 154(b) by 285 days.

(21) Appl. No.: 14/548,297

(22) Filed: Nov. 20, 2014

(65) Prior Publication Data

US 2016/0148031 A1 May 26, 2016

(51) Int. Cl.
*G06K 9/00* (2006.01)

(52) U.S. Cl.
CPC .................... *G06K 9/00053* (2013.01)

(58) Field of Classification Search
None
See application file for complete search history.

(56) References Cited

U.S. PATENT DOCUMENTS

| | | | | |
|---|---|---|---|---|
| 2005/0219200 A1* | 10/2005 | Weng | ................ | G06F 3/03547 345/104 |
| 2011/0267298 A1 | 11/2011 | Erhart et al. | | |
| 2012/0182253 A1* | 7/2012 | Brosnan | ................ | G06F 3/0416 345/174 |
| 2012/0242635 A1* | 9/2012 | Erhart | ................ | G06F 1/1626 345/207 |
| 2013/0307818 A1* | 11/2013 | Pope | ................ | G06F 3/044 345/174 |
| 2015/0090477 A1* | 4/2015 | Yang | ................ | H05K 3/28 174/250 |
| 2016/0004899 A1* | 1/2016 | Pi | ................ | G06F 1/1626 345/173 |
| 2016/0188032 A1* | 6/2016 | Lin | ................ | G06K 9/0002 345/174 |
| 2016/0188033 A1* | 6/2016 | Lin | ................ | G06F 3/044 345/174 |
| 2016/0232397 A1* | 8/2016 | Yu | ................ | G06K 9/00053 |
| 2016/0275333 A1* | 9/2016 | Lin | ................ | G06K 9/0002 |
| 2016/0307022 A1* | 10/2016 | Lin | ................ | G06F 3/041 |
| 2017/0083098 A1* | 3/2017 | Usui | ................ | G06F 3/041 |
| 2017/0193265 A1* | 7/2017 | Chan | ................ | G06F 3/044 |

FOREIGN PATENT DOCUMENTS

| | | |
|---|---|---|
| TW | 201439865 A | 4/2013 |
| TW | M491885 U | 12/2014 |
| TW | M494357 U | 1/2015 |

* cited by examiner

*Primary Examiner* — Wesley Tucker
(74) *Attorney, Agent, or Firm* — Nikolai & Mersereau, P.A.; C. G. Mersereau

(57) ABSTRACT

A touch panel with fingerprint identification function includes a glass substrate, a fingerprint identification device, a packaging layer, an optical adhesive layer and a sealing layer. The glass substrate has a visible section, a non-visible section and a first plane face. The non-visible section is formed with a recess having a bottom side. The fingerprint identification device is disposed in the recess, having a substrate having a first side. A silicon substrate is disposed on the first side and electrically connected to the substrate via a wire. Multiple fingerprint identification chips are disposed on one side of the silicon substrate. The packaging layer encloses the wire, the substrate and an exposed section of the silicon substrate. The optical adhesive layer is disposed between the fingerprint identification device and the bottom side of the recess. The sealing layer seals the fingerprint identification device in the recess of the glass substrate.

7 Claims, 4 Drawing Sheets

TOUCH PANEL WITH FINGERPRINT IDENTIFICATION FUNCTION

BACKGROUND OF THE INVENTION

1. Field of the Invention

The present invention relates generally to a touch panel with fingerprint identification function, and more particularly to a touch panel with fingerprint identification function, which is integrated with a fingerprint identification device.

2. Description of the Related Art

Along with the rapid advance of multimedia technique, more and more easy portable electronic devices have been developed and become inevitable implements in our daily life, such as personal digital assistant (PDA), digital camera, personal notebook and tablet. These portable electronic devices are quite personalized. Therefore, in case a user misses the portable electronic devices or the portable electronic devices are burglarized, all the data stored in the portable electronic devices, such as telephone book, photos, etc. may be utilized by unauthorized persons to cause unnecessary loss.

Therefore, such product necessitates a certain identity certification and authorization management to ensure the privacy of a user. The currently used identity certification means is mainly password protection. A user needs to first input correct password to the portable electronic device for access to the operation page of the portable electronic device. However, the security of the password protection is lower. This is because the password is likely to leak or break. Moreover, in case the user forgets the password, it will be quite troublesome. Therefore, portable electronic devices with fingerprint identification function for identity certification have been developed and commercially available. Human fingerprints are unique so that the security of the identity certification by fingerprint identification is much higher. In addition, the fingerprint identification for identity certification is relatively convenient to a user. The user can save the troubles of memorization and input of the password.

The existent fingerprint identification system is wisely applied to handheld device or mobile device. The most often seen fingerprint identification device is independently designed on one side of the keyboard of such as a notebook or backside or bottom side of one end of the handheld mobile device. The fingerprint identification device can be hardly integrated on the touch screen of the handheld mobile device to minify the volume of the handheld mobile device. Furthermore, the conventional fingerprint identification chip packaging module mainly includes a substrate, chips and packaging body. The chips are disposed on the substrate and electrically connected therewith. The packaging body is overlaid on the surface of the substrate and the chips.

The chip is coated with multiple layers of films so that the total thickness of the chip packaging module is thicker. Therefore, in general, when a finger touches the sensation section of the chip, the sensitivity of the chip packaging module is lowered.

The conventional slide-type fingerprint identification system has directionality. Moreover, the identification time is too long. Also, the conventional slide-type fingerprint identification system must be independently arranged. Therefore, the conventional slide-type fingerprint identification system can be hardly integrated with the touch screen and it is inconvenient to use such fingerprint identification system.

SUMMARY OF THE INVENTION

It is therefore a primary object of the present invention to provide a touch panel with fingerprint identification function, which is integrated with a fingerprint identification device.

To achieve the above and other objects, the touch panel with fingerprint identification function of the present invention includes a glass substrate, a fingerprint identification device, a packaging layer, an optical adhesive layer and a sealing layer.

The glass substrate has a visible section, a non-visible section, a first plane face and a second plane face. The non-visible section is formed with at least one recess having a bottom side. The fingerprint identification device is disposed in the recess. The fingerprint identification device has a substrate having a first side. A silicon substrate is disposed on the first side. The silicon substrate is electrically connected to the substrate via at least one wire. Multiple fingerprint identification chips are disposed on the other side of the silicon substrate distal from the substrate. The packaging layer encloses the wire and the first side of the substrate and an exposed lateral side of the silicon substrate. The optical adhesive layer is disposed between the fingerprint identification device and the bottom side of the recess. The sealing layer seals the fingerprint identification device in the recess of the glass substrate.

The fingerprint identification device is integrated on the touch panel to not only lower the manufacturing cost, but also enhance the touch sensitivity and accuracy.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
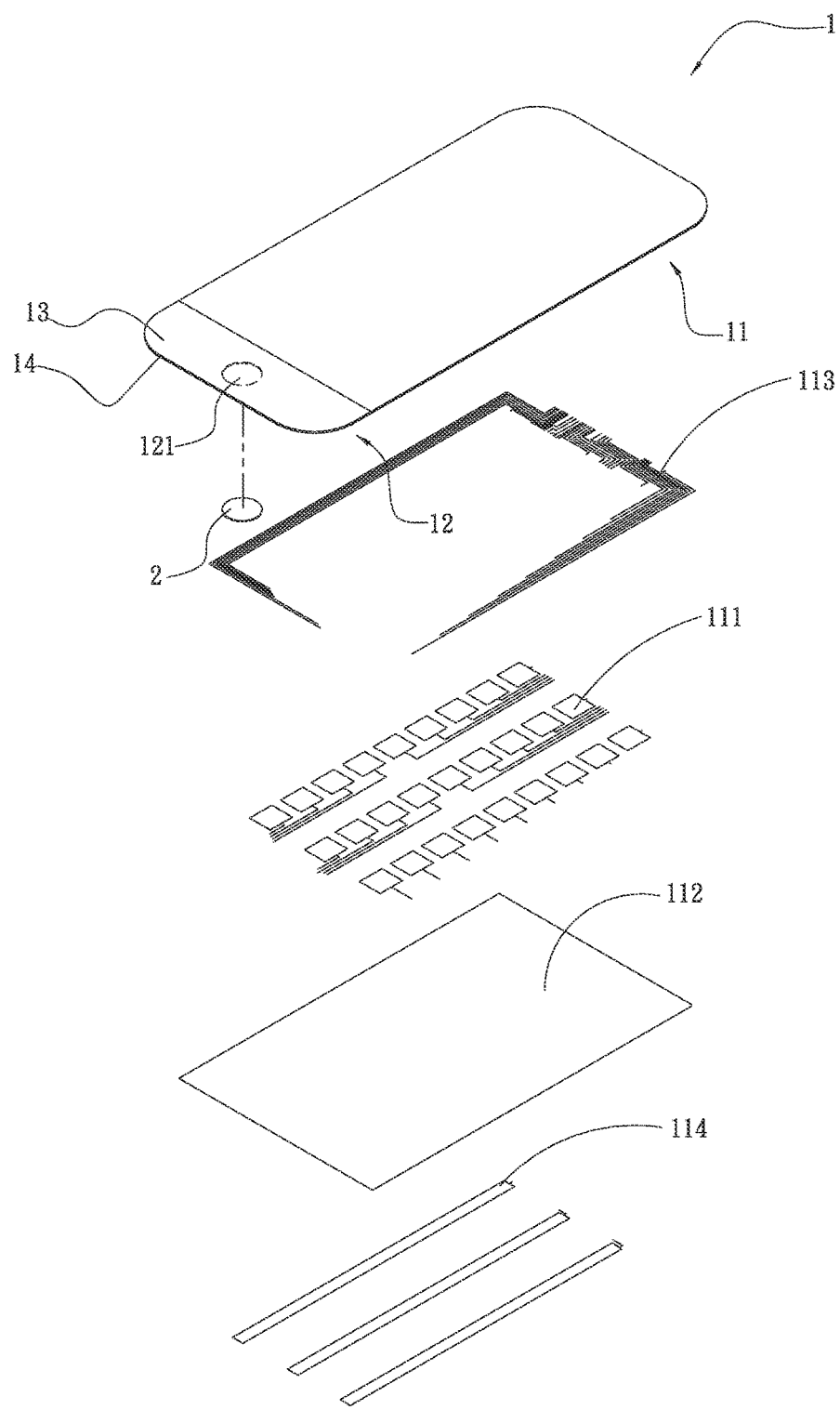
FIG. 1 is a perspective exploded view of a first embodiment of the touch panel with fingerprint identification function of the present invention.
Figure 2:
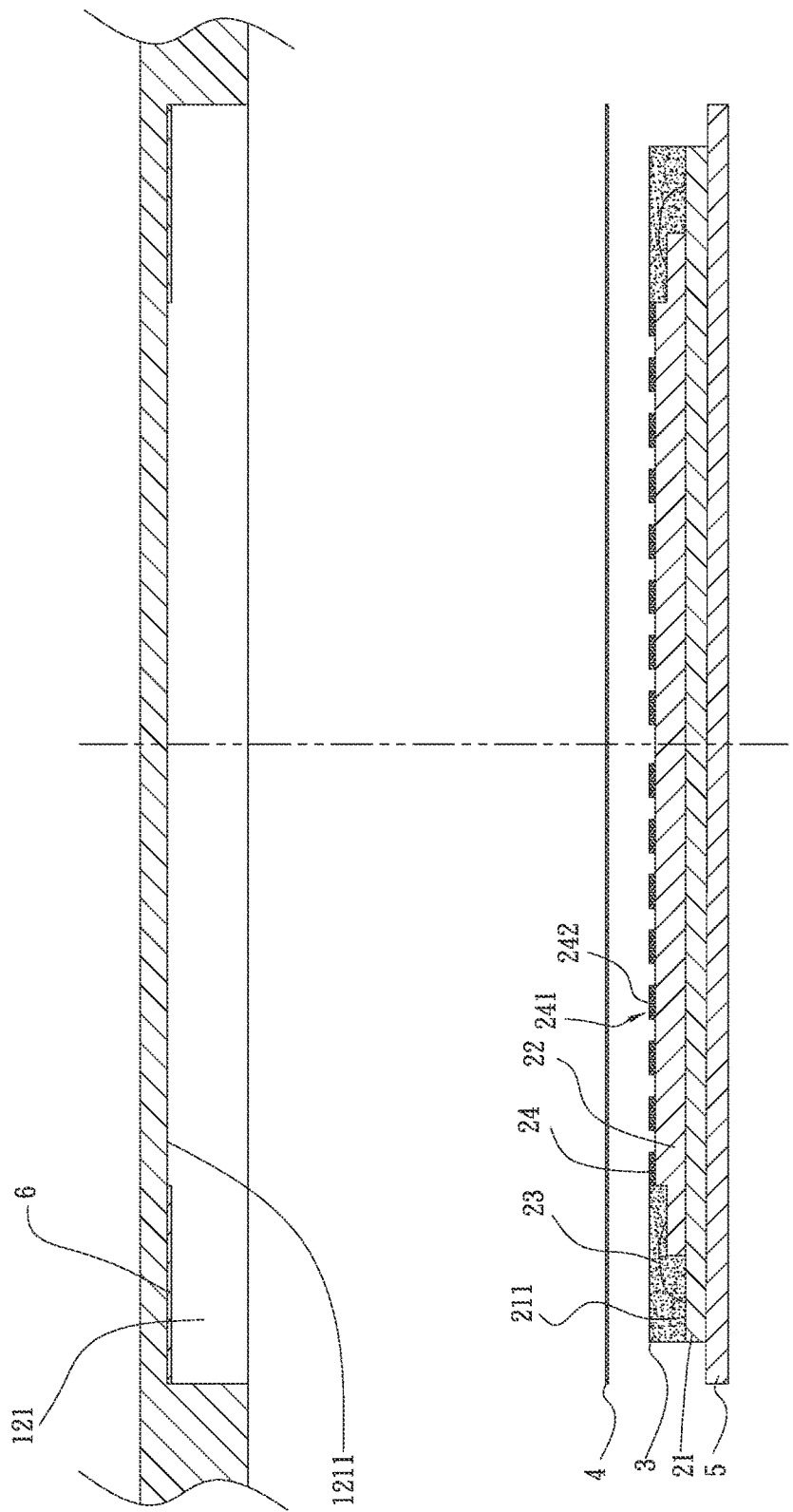
FIG. 2 is a sectional exploded view of the non-visible section of the first embodiment of the touch panel with fingerprint identification function of the present invention.
Figure 3:
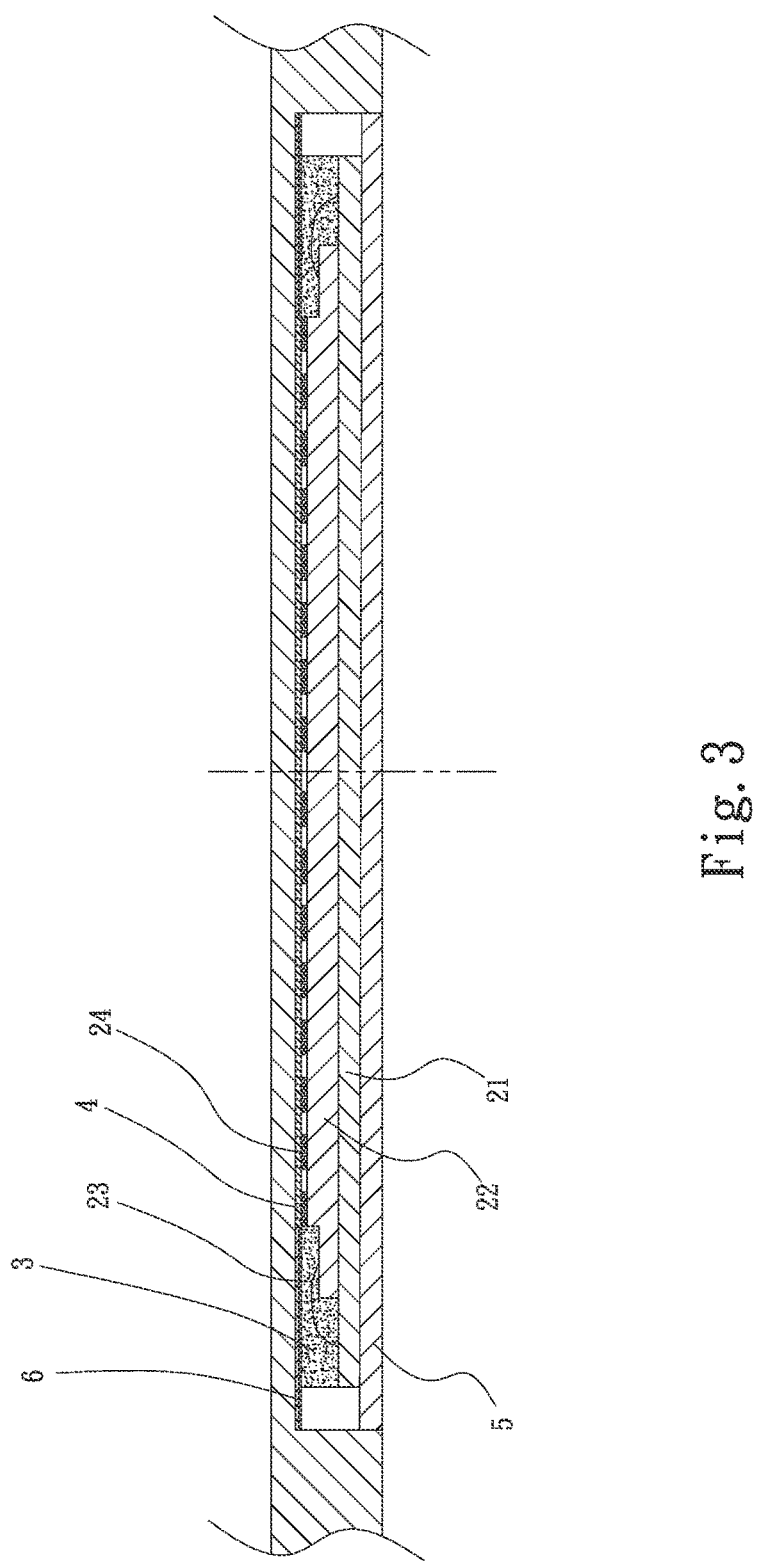
FIG. 3 is a sectional assembled view of the non-visible section of the first embodiment of the touch panel with fingerprint identification function of the present invention.

Please refer to FIGS. 1, 2 and 3. FIG. 1 is a perspective exploded view of a first embodiment of the touch panel with fingerprint identification function of the present invention. FIG. 2 is a sectional exploded view of the non-visible section of the first embodiment of the touch panel with fingerprint identification function of the present invention. FIG. 3 is a sectional assembled view of the non-visible section of the first embodiment of the touch panel with fingerprint identification function of the present invention. According to the first embodiment, the touch panel with fingerprint identification function of the present invention includes a glass substrate 1, a fingerprint identification device 2, a packaging layer 3, an optical adhesive layer 4 and a sealing layer 5.

The glass substrate 1 has a visible section 11, a non-visible section 12, a first plane face 13 and a second plane face 14. The non-visible section 12 of the second plane face 14 is formed with at least one recess 121. The recess 121 has a bottom side 1211.

The visible section 11 has a first electrode layer 111, an insulation layer 112, a wiring layer 113 and a second electrode layer 114. The first and second electrode layers 111, 114 are electrically connected with the wiring layer 113.

The fingerprint identification device 2 is disposed in the recess 121. The fingerprint identification device 2 has a substrate 21 having a first side 211. A silicon substrate 22 is disposed on the first side 211. The silicon substrate 22 is electrically connected to the substrate 21 via at least one wire 23. Multiple fingerprint identification chips 24 are disposed on the other side of the silicon substrate 22 distal from the substrate 21. Each fingerprint identification chip 24 has a sensation section 241 and a top face 242. The sensation section 241 is formed on the top face 242.

The packaging layer 3 encloses the wire 23 and the first side 211 of the substrate 21 and the exposed lateral side of the silicon substrate 22.

The optical adhesive layer 4 is disposed between the fingerprint identification device 2 and the bottom side 1211 of the recess 121. The sealing layer 5 seals the fingerprint identification device 2 in the recess 121 of the glass substrate 1.

The fingerprint identification chips 24 and the silicon substrate 22 are electrically connected with the substrate 21 via the wire 23 by means of wire bonding. Alternatively, the fingerprint identification chips 24 and the silicon substrate 22 can be electrically connected with the circuit of the substrate 21 by other means, for example, by means of flip chip or other packaging means. The manner in which the fingerprint identification chips 24 and the silicon substrate 22 are arranged in not limited.

The recess 121 further has a shielding layer 6. The shielding layer 6 is disposed on one side of the packaging layer 3 proximal to the recess 121 between the recess 121 and the optical adhesive layer 4.

The shielding layer 6 only covers the section of the packaging layer 3 that is free from the fingerprint identification chips 24. The shielding layer 6 only shields an upper side of the wire 23 in the packaging layer 3. The distance between the first plane face 13 and the bottom side 1211 of the recess 121 ranges from 0.1 mm to 0.3 mm.

The material of the shielding layer 6 is selected from a group consisting of silicone material, epoxy material and acryl material. The shielding layer 6 is coated on the packaging layer 3 without covering the fingerprint identification chips 24 by means of spraying.

The material of the sealing layer 5 is selected from a group consisting of epoxy material, acryl material and silicone material.

Figure 4:
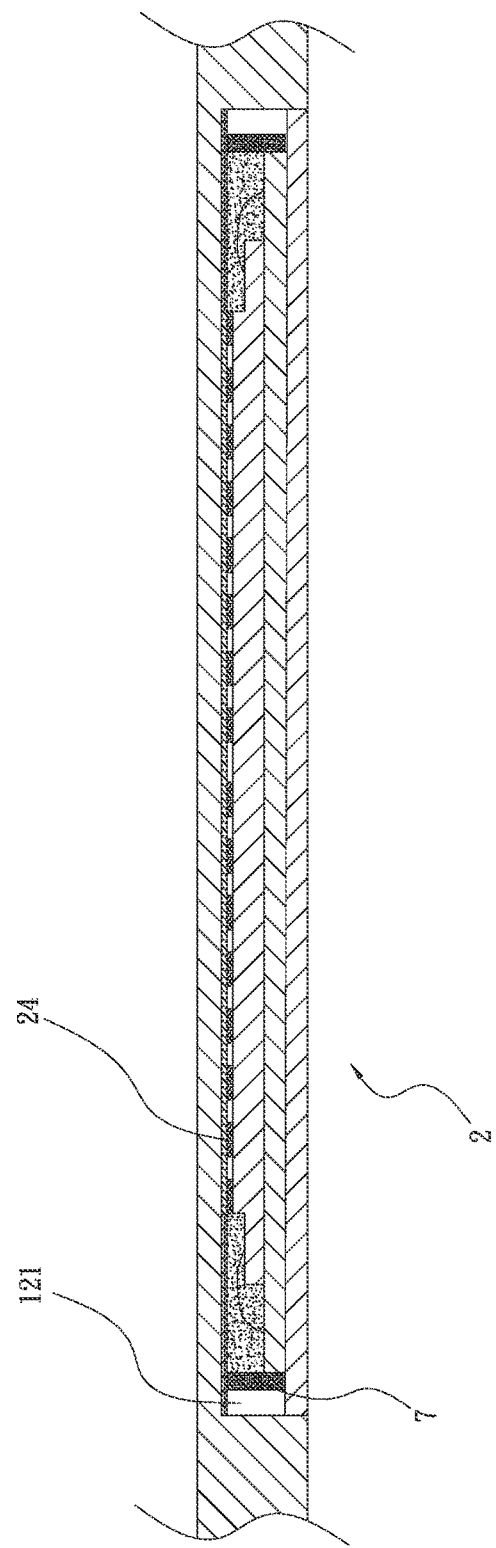
FIG. 4 is a sectional assembled view of a second embodiment of the touch panel with fingerprint identification function of the present invention.

Please now refer to FIG. 4, which is a sectional assembled view of a second embodiment of the touch panel with fingerprint identification function of the present invention. The second embodiment is partially identical to the first embodiment in structure and thus will not be repeatedly described hereinafter. The second embodiment is different from the first embodiment in that an outer ring body 7 is further disposed between the fingerprint identification device 2 and the recess 121. The outer ring body 7 is disposed around the fingerprint identification device 2. The outer ring body 7 is a metal ring or a printed metal conductor.

In order to enhance the sensitivity of the fingerprint identification device 2, a finger must be very close to the fingerprint identification chips 24 of the conventional fingerprint identification device 2 for achieving higher identification ratio. When a human finger or other objects contact the fingerprint identification chips 24, electrostatic discharge (ESD) may take place to cause damage of the fingerprint identification chips 24. In order to minimize the damage to the fingerprint identification chips 24 due to ESD, the fingerprint identification device 2 of the present invention further includes the outer ring body 7, which is metal ring or a printed metal conductor. The material of the metal ring is metal material or alloy material such as nickel/iron alloy or copper alloy.

The outer ring body 7 serves to transfer the static brought by the finger or other objects to outer side. Therefore, the outer ring body 7 serves to protect the fingerprint identification device 2 from ESD.

The present invention has been described with the above embodiments thereof and it is understood that many changes and modifications in the above embodiments can be carried out without departing from the scope and the spirit of the invention that is intended to be limited only by the appended claims.

What is claimed is:

1. A touch panel with fingerprint identification function, comprising:

a glass substrate having a visible section, a non-visible section, a first plane face and a second plane face, the non-visible section being formed with at least one recess having a bottom side such that the at least one recess does not extend through the glass substrate;

a fingerprint identification device disposed in the recess, the fingerprint identification device having a substrate having a first side, a silicon substrate being disposed on the first side, the silicon substrate being electrically connected to the substrate via at least one wire, multiple fingerprint identification chips being disposed on the other side of the silicon substrate distal from the substrate; wherein the visible section has a first electrode layer, an insulation layer, a wiring layer and a second electrode layer, the first and second electrode layers being electrically connected with the wiring layer;

a packaging layer enclosing the wire and the first side of the substrate and an exposed lateral side of the silicon substrate;

an optical adhesive layer disposed between the fingerprint identification device and the bottom side of the recess, the fingerprint identification chips of the fingerprint identification device being attached to the optical adhesive layer; and a sealing layer sealing the fingerprint identification device in the recess of the glass substrate.

2. The touch panel with fingerprint identification function as claimed in claim 1, wherein each fingerprint identification chip has a sensation section and a top face, the sensation section being formed on the top face.

3. The touch panel with fingerprint identification function as claimed in claim 1, wherein the recess further has a shielding layer, the shielding layer being disposed on one side of the packaging layer proximal to the recess.

4. The touch panel with fingerprint identification function as claimed in claim 1, further comprising an outer ring body disposed around the fingerprint identification device.

5. The touch panel with fingerprint identification function as claimed in claim 4, wherein the outer ring body is a metal ring or a printed metal conductor.

6. The touch panel with fingerprint identification function as claimed in claim 1, wherein the material of the sealing layer is selected from a group consisting of epoxy material, acryl material and silicone material.

7. The touch panel with fingerprint identification function as claimed in claim 1, wherein the distance between the first plane face and the bottom side of the recess ranges from 0.1 mm to 0.3 mm.

* * * * *